United States Patent [19]

Nichols

[11] Patent Number: 5,332,624
[45] Date of Patent: Jul. 26, 1994

[54] SLIP-RESISTANT POLYOLEFIN FILM AND PROCESS FOR PREPARATION THEREOF

[75] Inventor: Kenneth Nichols, Erin, Canada

[73] Assignee: Wastecorp, International Investments Inc., Ontario, Canada

[21] Appl. No.: 156,731

[22] Filed: Nov. 24, 1993

[51] Int. Cl.$^5$ ............... C08L 23/00; C08L 17/00; B29C 47/88; B29D 7/00
[52] U.S. Cl. .................... 428/327; 428/212; 264/175; 264/210.5; 264/DIG. 69; 525/232
[58] Field of Search ............... 525/232; 428/212, 327; 264/175, 210.5, DIG. 69

[56] References Cited

U.S. PATENT DOCUMENTS 4,518,654  5/1985  Eichbauer ..................... 428/331

FOREIGN PATENT DOCUMENTS 2177706  1/1987  United Kingdom ............... 525/232

*Primary Examiner*—David Buttner
*Attorney, Agent, or Firm*—Patrick J. Hofbauer

[57] ABSTRACT

This invention relates to a slip-resistant, flexible polyolefin thin film having first and second opposed, generally planar surfaces, the film comprised of vulcanized comminuted rubber particles of between 20 to 30 mesh size and, a thermoplastic low molecular weight polyolefin polymer, wherein the rubber particles are generally evenly distributed in planar orientation throughout the film, and, wherein the rubber particles are biased in their transverse placement within the thin film toward said second surface of the thin film.

An inventive process for producing the thin film described above is also disclosed.

18 Claims, 2 Drawing Sheets

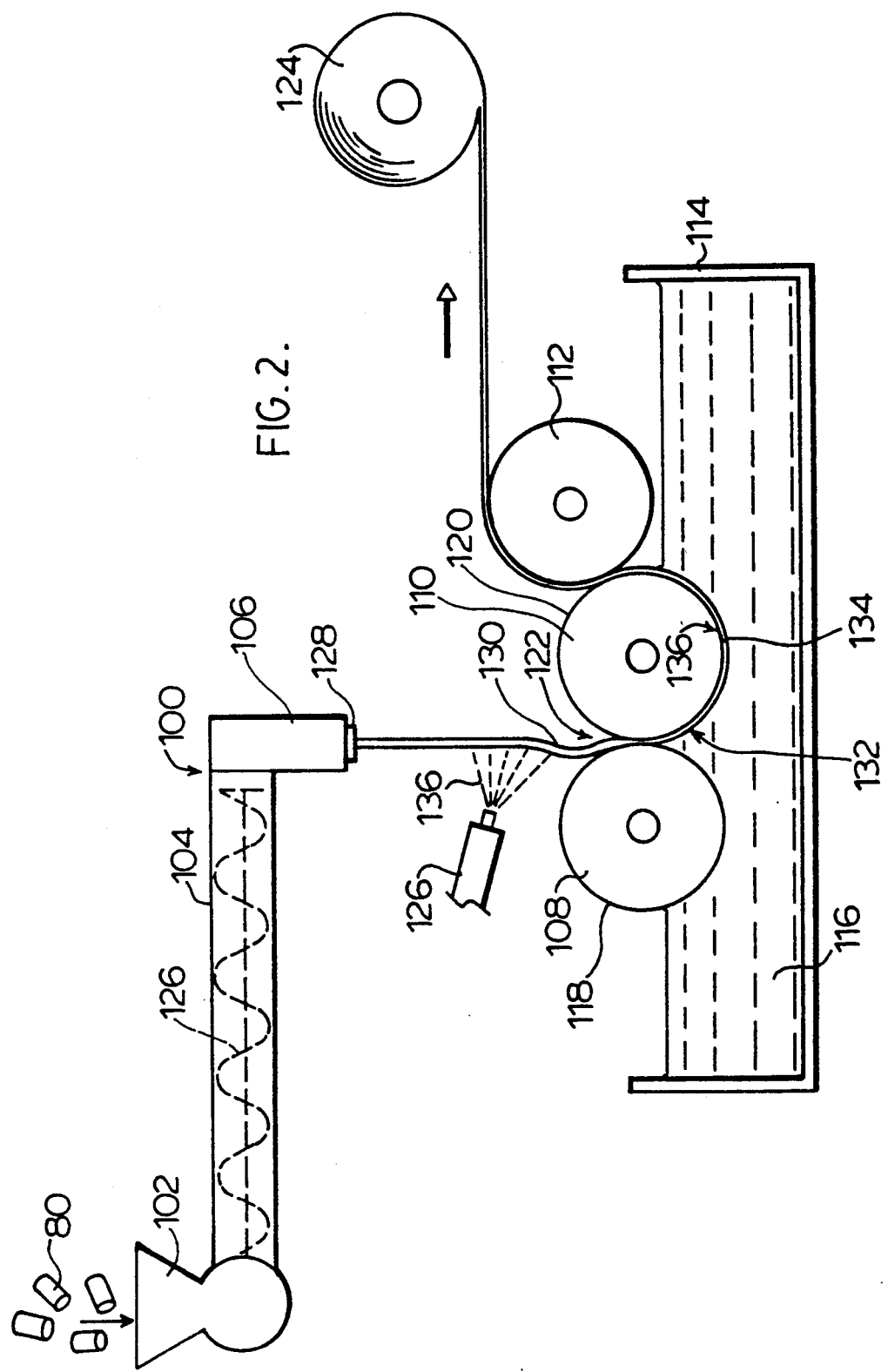

SLIP-RESISTANT POLYOLEFIN FILM AND PROCESS FOR PREPARATION THEREOF

FIELD OF THE INVENTION

The present invention relates to flexible polyolefin films of less than thirty thousands of an inch thickness, and more particularly to a novel form of such film having measurably different friction characteristics on its two opposed planar surfaces, and to a method of producing such a film.

BACKGROUND OF THE INVENTION

Thermoplastic thin films enjoy ubiquitous use in modern society. The most common types of such thin films are flexible, having polyolefin polymers as their chief chemical constituent. Typical uses of these thin films include but are in no way limited to: food wrap; drop-sheets for painting and decorating; vapour barriers for buildings and automotive applications including vehicle doors; as a substitute for canvas tarpaulins; as packaging films; and product labels. The widespread use of flexible polyolefin thin films stems not only from their relatively low material cost, but also from their relative ease of production. For polyolefin films less than 0.030" thickness, referred to in this specification and claims as "thin films", a film casting line is typically used to produce the film on a continuous basis in high volumes. Most importantly, the production processes used to produce polyolefin thin films can be carried out in a single process step, meaning that no significant processing of the film (other than cutting or sizing) is typically required after the initial film forming process in order to have a saleable end product. However, the polyolefin thin film thus produced has the same relatively low coefficient of friction (i.e., is relatively slippery) on both of its planar surfaces. Thus, in applications where it is desired to employ a polyolefin thin film having at least one planar surface with a coefficient of friction higher than that normally exhibited by such thin films, it is necessary to emboss, sandblast, laminate or otherwise treat such surfaces(s) of the film in a subsequent process step to achieve rougher surface characteristics, which subsequent treatment substantially increases the production costs of the end product. Moreover, the slipperiness of conventional polyolefin thin films causes specific application difficulties where surface adhesives are involved. For example, with polyolefin thin film vapour barriers used in automotive door applications, it is common to use conventional solvent-based rubber adhesives to adhere and seal the vapour barriers to the vehicle door frame behind the upholstery panels of the vehicle door. However, because of the slipperiness of conventional polyolefin thin films, such adhesion of the thin film fails over relatively short periods of time, with the result that polyolefin vapour barriers tend to fall away from vehicle door frames, particularly when the upholstery panels are removed to service components located within the interior of the vehicle door. It is not cost-efficient to laminate or otherwise further treat conventional polyolefin thin films used as vapour barriers in such applications so as to increase the coefficient of friction on the planar surface to which the adhesive is normally applied, with the result that relatively premature adhesive-to-vapour barrier failure remains an unsolved problem in relation to automotive vehicle doors.

Thus, there is a need for a polyolefin thin film having higher friction characteristics on at least one of its two planar surfaces than conventional polyolefin thin films. Thin films having such enhanced surface friction characteristics are hereinafter referred to in this specification and claims as "slip-resistant" films. Moreover, there is a need for polyolefin slip-resistant films that can be produced in a single process step. Ideally, such polyolefin slip-resistant films can be produced using existing thin film production equipment with a minimum of modification to such equipment.

Scrap tires from automotive vehicles pose a particularly serious threat to the environment. Numerous products have been developed over the last several decades which utilize to varying degrees the vulcanized rubber from scrap tires as a component in their production, thus obviating the need to send the tires so utilized to landfill or other waste disposal sites. Despite the development of such products, there remains available in the marketplace an excess of vulcanized scrap rubber from automotive tires. Such scrap rubber is available in bulk as a commodity in the form of comminuted rubber particles, substantially free of the metal and textile components of the tires. The price of such rubber particles is relatively low when compared with the price of polymers, notably, polyethylene and polypropylene. However, vulcanized rubber is not normally compatible in mixtures with polyolefins, as entrapped air from irregular and crater-like surfaces of the comminuted rubber creates voids and inconsistent texture in the prior art. This is particularly problematic in relation to polyolefin thin films, with the result that no significant use of vulcanized scrap rubber particles has been successfully made in the field of polyolefin thin films. Thus, it would, be environmentally desirable to have available in the marketplace polyolefin thin films which utilize vulcanized scrap rubber in significant amounts as one of its constituents.

It is, therefore, an object of the present invention to provide a slip-resistant polyolefin thin film having at least one planar surface with a coefficient of friction higher than that normally exhibited by such polyolefin thin films.

It is a further object of the present invention to provide a slip-resistant polyolefin thin film as aforesaid, which thin film can be produced in a single process step using existing polyolefin thin film production equipment with a minimum of modification to such equipment.

It is a further object of the present invention to provide a flexible polyolefin thin film which makes use of scrap vulcanized rubber, such as is available from recycled automotive tires, as a major constituent of the thin film, in order to reduce the need to send such scrap rubber to landfill or other waste disposal sites.

It is yet a further object of the present invention to provide a flexible polyolefin thin film which has a reduced cost when compared with conventional thin films having slip-resistant characteristics.

It is still a further object of the present invention to provide a flexible polyolefin thin film which has better noise attenuation characteristics when compared with conventional polyolefin thin films of similar thickness. This is especially advantageous in vehicle door vapour barrier applications so as to reduce road noise in the vehicle.

SUMMARY OF THE INVENTION

In accordance with a first aspect of the present invention there is disclosed a method of producing a slip-resistant polyolefin thin film comprising the steps of:

(a) forming a mixture of comminuted rubber material and a thermoplastic low molecular weight polyolefin polymer;

(b) feeding the mixture into an extrusion means to melt said polymer and thereafter pumping said mixture through an extrusion die to plasticize said mixture;

(c) providing a pair of parallel, counter-rotating first and second rolls in pre-set operatively close spaced relation, said first roll providing a generally smooth first outer circumferential surface and said second roll providing a generally smooth second outer circumferential surface, the circumferential surfaces together defining a nip between the rolls;

(d) extruding said plasticized mixture from said die onto said first and second surfaces so as to produce an inventory of said plasticized mixture atop said nip;

(e) cooling said inventory so as to cause the temperature of the inventory contacting said first outer circumferential surface to be between 75 to 150 degrees Fahrenheit cooler than the inventory contacting the second outer circumferential surface;

(f) drawing said inventory into said nip so as to form a thin film of ordered thickness having opposite first and second surfaces respectively contacting the first and second outer circumferential surfaces of said first and second sizing rolls;

(g) drawing the thin film thus formed from said nip through one or more cooling stages to further cool and stabilize said film;

(h) collecting the thin film thus stabilized on one or more winder rolls adapted for such collection;

wherein the first surface of said thin film thus produced is relatively more slip-resistant than the second surface of said thin film.

In accordance with a preferred embodiment according to the first aspect, the mixture of the first step is in the form of pre-formed pellets produced by the sub-process of:

a) mixing together the vulcanized comminuted rubber material, the polyolefin polymer and conventional process aids chosen from the group consisting of stabilizers, lubricants, colorants, anti-oxidants, and odour masking agents, until a substantially homogenous admixture is obtained;

b) heating the admixture of step a) in a compounder to between 300–450 degrees Fahrenheit while mixing the admixture under shear; and, c) pelletizing the product of step b) in a pelletizer to a produce pre-formed pellets having a bulk density of at least 30 pounds per cubic foot.

In accordance with a second aspect of the present invention there is disclosed a slip-resistant, flexible polyolefin thin film having first and second opposed, generally planar surfaces, the film comprised of:

a) vulcanized comminuted rubber particles of between 20 to 30 mesh size; and, b) a thermoplastic low molecular weight polyolefin polymer;

wherein the rubber particles are generally evenly distributed in planar orientation throughout the film, and, wherein the rubber particles are biased in their transverse placement within the film toward said second surface of the film. Preferably, the vulcanized comminuted rubber material is obtained from scrap vehicle tires.

Other objects, advantages, features and characteristics of the present invention, as well as methods of use and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
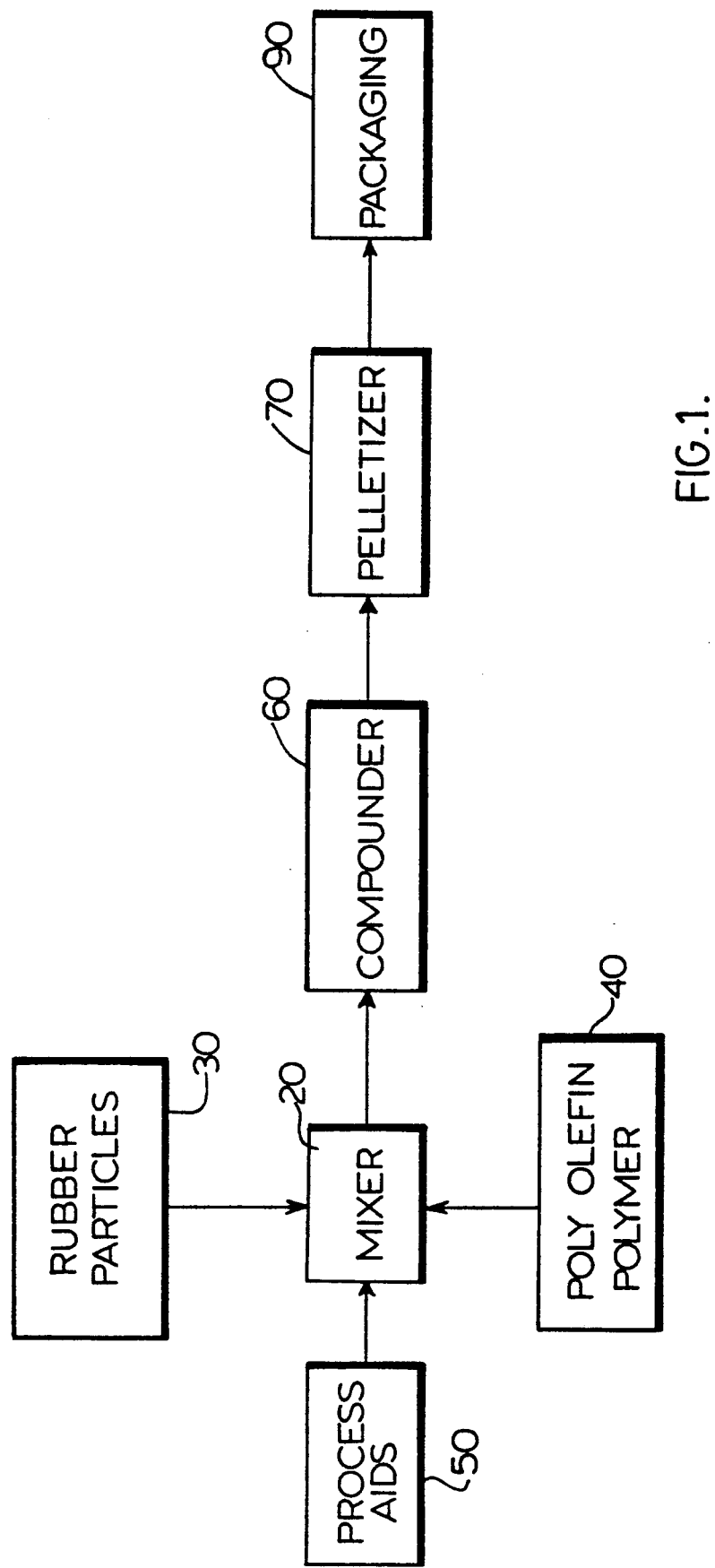
FIG. 1 of the drawings is a flow chart illustrating a process for producing pre-formed pellets useful in the method of FIG. 2; and, FIG. 2 of the drawings is a diagrammatical illustration of a thin film casting line modified to carry out a preferred method of producing slip-resistant polyolefin thin film according to the invention.

In FIG. 1 of the drawings, there is diagrammatically shown several sub-steps in a process for producing a pelletized mixture of comminuted rubber material and a low molecular weight polyolefin polymer, which mixture is especially suited for use in the thin film casting process of the invention as more fully described below with reference to FIG. 2. The pelletized mixture is derived by the sub-steps of FIG. 1 as follows. Comminuted rubber particles 30, preferably vulcanized comminuted rubber particles of 20-30 mesh size derived from scrap automotive tires, are mixed together in a conventional ribbon type mixer 20 with a polyolefin polymer 40. Suitable comminuted vulcanized rubber particles of this size range and free of the textile and steel components of the automotive tires are commercially available in bulk pre-packaged form. The low molecular weight polyolefin polymer is constituted of lower alkene or alkadiene monomers, with a preferred polyolefin polymer 40 being commercially available polyethylene. The comminuted vulcanized rubber particles 30 should make up between 10 to 35 percent of the initial rubber/polyolefin mixture, while with the preferred percentage being about 20 percent by weight. While rubber percentages above 35 percent by weight may be employed, the thin film produced therefrom will lack sufficient memory to be stable for most thin-film commercial applications. To the initial mixture of comminuted rubber particles 30 and polyolefin polymer 40 there may be added actively operative amounts of conventional process aids 50 chosen from known lubricants, colorants, stabilizers and odour masking agents. Process aids are advantageously added to the initial mixture in operatively routine amounts to accelerate and thermally protect the subsequent process steps, as well as to mask the odour of the rubber in the final thin-film product. The comminuted vulcanized rubber particles, polyolefin polymer 40 and process aids 50 are thoroughly blended in the mixer 20 for approximately 20 to 30 minutes until a substantially homogenous admixture is obtained. The admixture thus obtained is removed from the mixer 20 and placed into a conventional compounder 60, such as a Banbury and/or a Farell continuous mixer, where it is mixed under shear and heated to between about 300–450 degrees Fahrenheit. This mixing under shear in the compounder 60 must be continued sufficiently long to ensure that the rough, irregular surfaces of the comminuted rubber particles 20 are fully wetted out with the polyolefin polymer 40. Typical times for this step are about 2 minutes to 4 minutes, but are routinely variable depending upon the particular polyolefins, process aids, and mixer capacity utilized.

Once the comminuted vulcanized rubber particles 30 are fully wetted out as aforesaid, the compounded product thus formed is passed through to a conventional plastics pelletizer 70, where it is formed into pellets 80 for subsequent packaging 90 and use in the process of the invention as more fully described hereinafter. The pellets 80 thus produced should have a bulk density of at least 30 pounds per cubic foot for use with a thin-film casting line as diagrammatically depicted in FIG. 2.

Referring now to FIG. 2 of the drawings, there is diagrammatically illustrated a conventional thin film casting line, designated by the general reference numeral 100. The thin film casting line 100 comprises a hopper 102, an extrusion means 104, an extrusion die 106 and a pair of parallel, counter-rotating first 108 and second 110 rolls arranged in pre-set operatively close spaced relation. A third idler roll 112 is also preferably provided in parallel relation to the rolls 108 and 110 downstream of the first 108 and second 110 rolls, as illustrated. The first 108 and second 110 rolls are partially immersed in a cooling bath 114 filled with an inert liquid coolant 116, such as water, maintained at a substantially constant pre-set temperature between about 100 and 150 degrees Fahrenheit, which cooling bath 114 and coolant 116 together define a first cooling stage. A winder roll 124 is positioned in generally parallel relation to the third idler roll 112 downstream thereof. Each of the first 108 and second 110 rolls have respective first 118 and second 120 outer circumferential surfaces, which surfaces 118 and 120 together define a nip 122 between the sizing rolls 108 and 110. Additional cooling stages (not shown) may be optionally disposed, between the idler roll 112 and the winder roll 124, as needed.

The conventional thin film casting line 100 thus far described is modified according to the preferred embodiment of the present invention to position a coolant spray means 126 in proximity to the generally smooth first outer circumferential surface 118 of the first roll 108 above the nip 122, as seen in FIG. 2. The purpose and manner of operation of this coolant spray means 126 will become apparent as this description proceeds.

In order to produce a slip-resistant thin film according to the invention, the mixture of comminuted rubber material and thermoplastic low molecular weight polymer, in the form of the pellets 80, are loaded into the hopper 102 in a conventional manner as with commercially available pure polyolefin pellets. The pellets 80 move from the hopper 102 into the extrusion means 104 where they are heated to a temperature of between approximately 320-390 degrees Fahrenheit, (the optimum temperature being dependant upon the particular polyolefin utilized), whereat they are fully melted. The heated mixture formed from the melted pellets 80 is thereafter pumped by an internal screw 126 of the extrusion means 104 through the extrusion die 106 to thereby fully plasticize the mixture. The mixture thus plasticized is extruded from the extrusion die 106, which has a routinely determinable temperature of between about 340 to 390 degrees Fahrenheit, as a loosely cast film 128, and falls under the influence of gravity onto the first 118 and second 120 outer circumferential surfaces of the first 108 and second 110 rolls, respectively, so as to form an inventory 130 of the mixture atop the nip 122. The inventory 130 is shown diagrammatically in FIG. 2 in the form of a convoluted loosely formed film, but may, depending upon the particular polyolefin polymer used and the temperature of the extrusion die 106, be an amorphous inventory of gelatinous melted resin sitting atop the nip 122.

The inventory 130 is drawn from the first 118 and second 120 outer circumferential surfaces into the nip 122 formed between the first 108 and second 110 rolls, so as to be pressed therebetween to form a thin film 132 of ordered thickness between about 0.005" to 0.030", having opposite first 134 and second 136 surfaces respectively contacting the first 118 and second 120 outer circumferential surfaces of the first 108 and second 110 rolls.

Prior to the inventory 130 being drawn into the nip 122, it is cooled so as to cause the temperature of the inventory coming into contact with the first outer circumferential surface 118 of the first roll 108 to be between 75 to 150 degrees Fahrenheit cooler than the inventory contacting the second outer circumferential surface 120. This step, sometimes referred to hereinafter in this specification as "differential cooling of the inventory", is accomplished by having the coolant spray means 126 spray an inert liquid coolant 136, such as water, onto the inventory 130 so as to contact the inventory only on the side of the loosely cast film 128 which becomes the first surface 134 of the thin film 132. Routine experimentation will determine the optimum temperature and flow rates of the coolant 136 necessary to achieve the desired degree of differential cooling of the inventory 130 with respect to the particular polyolefin polymer used in the process, which in turn effects the temperature of the extrusion die 106 and of the loosely cast film 128. Optionally, the first 108 roll may itself be differentially cooled by, for example, circulating cooling water cooler than the liquid coolant 116 through the interior of the first roll 108, thereby to produce the indicated temperature differential of 75 to 100 degrees Fahrenheit between the first 118 and second 120 outer circumferential surfaces, which differential is, in turn, imparted to the inventory 130 as it passes through the nip 122. However, this latter arrangement of differential cooling of the inventory 122 involves more extensive modifications to conventional thin film casting lines. Thus, differential cooling of the inventory 122 through the use of a coolant spray means 126 is preferred for its simplicity and adaptability to conventional thin film casting lines.

The effect of the differential cooling of the inventory 130 as it passes through the nip 122 causes the cooler first surface 134 of the thin film 132 emerging downstream from the rolls 108 and 110 to appear generally smoother and shinier in its finish than the second surface 136 of the thin film. In contrast, the second surface 136 of the thin film is rougher to the touch, and duller in appearance. On closer examination, it will be seen that while the vulcanized comminuted rubber particles 30 are generally evenly distributed in planar orientation throughout the thin film 132, they are biased in their transverse placement within the thin film 132 towards the second (warmer) second surface 136 thereof. While the comminuted vulcanized rubber particles 30 are readily visible as black speck-like particles on both surfaces 134 and 136 of the thin film 132 thus produced, closer inspection reveals that they actually protrude above the base plane of the second generally planar surface 136 only, and are substantially flush with the base plane of the first generally planar surface 134 of the thin film 132. Thus the comminuted vulcanized rubber particles appear to have migrated, perhaps because of kinetic energy considerations, toward the second (warmer) outer circumferential surface 120 of the second roll 110 during the passage of the inventory 130 through the nip 122. Alternatively, faster cooling of that portion of the inventory adjacent to the first outer circumferential surface 118 may cause it to set faster than the relatively warmer portion of the inventory adjacent to the second circumferential surface 120, thus forcing the comminuted rubber particles out of the path of the rapidly forming polymer chains and branched chains of the former portion toward the relatively softer unset latter portion of the inventory. Regardless of the actual method of action, differential cooling of the mixture as aforesaid as it passes through the nip 122 of the rolls 108 and 110 causes the thin film 132 thus produced to have opposed first 134 and second 136 surfaces with measurably different friction characteristics due to the relative displacement of the comminuted vulcanized rubber particles 30 toward the second surface 136 of the tin film 132. In actuality, the first surface 134 of the thin film 132 is more slip-resistant than the second surface 136 of the thin film, at least where standard tests such as ASTM D1894 measuring coefficients of friction, are concerned. This apparent anomaly is thought to be explained by the fact that the relatively rougher looking second surface 136 of the thin film 132 presents less surface area for contact with the undersurface of the sled used in standardized coefficient of friction tests, as the raised irregular surfaces of the comminuted rubber particles 30 protruding above the base plane of the second surface 136 lift the sled above the base plane of such surface. In contrast, the sled used in such tests has considerably more of its undersurface in contact with the base plane of the first surface 134 of the thin film 132 during the tests. In real world applications, the relative slip-resistance of the first surface 134 as compared with that of the second surface 136 depends to a significant degree upon the cooperating surface against which the thin film 132 is placed in contact. That is, the first surface 134 will generally be more slip resistant when placed against smoother surfaces, while the second surface 136 will be generally more slip resistant when placed against rougher surfaces.

However, it will be seen from the examples which follow, that both the first 134 and second 136 surfaces of the thin film 132 exhibit increased slip resistance as compared to either side of a conventional thin film formed from the same polyolefin polymer and having no comminuted rubber particles incorporated therein according to the present invention.

The thin film 132 thus formed by passage of the inventory 130 through the nip 122 is drawn therefrom though the first cooling stage, represented by the cooling bath 114 and coolant 116, onto the idler roll 112, where further cooling and stabilization of the thin film 132 occurs. Numerous other rolls (not shown) may be conventionally employed to facilitate the transport of the thin film 132 from the idler roll 112 to the winder roll 124, which winder roll 124 is motor driven to collect the thin film 132 thus stabilized during passage through the cooling stages. When a particular winder roll is filled with the thin film collected, it is changed for an empty roll and the collecting step continues. Thus, the slip-resistant polyolefin thin film 132 may be produced in a substantially continuous method, as is the case with conventional polyolefin thin films produced on known thin film casting lines. The following example will further illustrate the nature of the invention.

EXAMPLES

EXAMPLE 1

A process as generally shown in FIG. 1 was carried out to produce a quantity of pre-formed pellets useful in the Examples 1 and 2 which follow. According to this process, high grade reground vulcanized rubber particles made up from truck and passenger tread rubber, free of fabric, steel and other foreign material and ground through a 30 mesh screen was used. The reground comminuted rubber particles had the approximate specifications shown in Table 1. The rubber particles were supplied in 50 pound bags from Baker Rubber Inc. of Southbend, Ind., U.S.A. under the trademark "GRANULITE".

TABLE 1

| PRODUCT ANALYSIS: | MINIMUM | MAXIMUM | TEST METHOD |
|---|---|---|---|
| Acetone Extract | 9.0 | 17.0% | BTM-4-07 |
| Ash Content | — | 7 0% | BTM-4-05 |
| Carbon Black Content | 27.0% | 38.0% | BTM-4-10 |
| Moisture Content | — | 0.75% | BTM-4-04 |
| Rubber Hydrocarbon | 45 0% | — | |
| Bulk Density (typical) | 100 gm/210 cc | | BTM-4-02 |

| SIEVE ANALYSIS SPECIFICATION: (BTM-5-01) | | |
|---|---|---|
| MESH SIZE | NOMINAL OPENING | % RETAINED |
| 20 | .0331 | trace |
| 30 | .0234 | 5.0% Max. |
| 40 | .0165 | 25.0% Min. |

Thermoplastic polyethylene polymer, produced by Dupont Chemical Co. under the trademark SCLAIR—11R, was used as the low molecular weight polyolefin polymer. This material was supplied in granular bag form. It has a specific gravity of 0.917. The ratio by weight of the comminuted rubber particles to polyethylene polymer was approximately 1:5.

The process aids set out in Table 2 were added to the aforesaid mixture of comminuted rubber particles and polyethylene polymer.

TABLE 2

| PROCESS AID TYPE | SOURCE | TRADEMARK |
|---|---|---|
| Odour Masking Agent | International Flavour & Fragrance N.J., U.S.A. | TALCUM-POWDER |
| Lubricant | Deer Polymer Inc. Michigan, U.S.A | ZINC STEARATE ST-105 |
| Colorant | Ferro Colors U.S.A. | |
| Stabilizer U.V. | Ciba Geigy Inc. | TINUVIN 440 |
| Anti-Oxidant | Ciba-Geigy Inc. | IRGANOX 1010 |

The resulting mixture was thoroughly blended in a ribbon blender, 5,000 lb capacity mixer, for not less than 20 minutes until a substantially homogenous admixture was obtained. The admixture thus obtained was removed to a conventional compounder, being a Banbury, Model No. 12 compounder, and mixed under shear therein at 360 degrees Fahrenheit for 2.85 minutes. The compounded product thus formed was removed while still hot to a conventional pelletizer line, being a 15" Farell extruder hot melt pump pelletizer.

The pellets thus produced were routinely packaged for use in the thin film process of the invention illustrated in FIG. 2 discussed in Examples 1 and 2. The pellets thus produced exhibited a bulk density of 31 lbs/cubic foot.

The pellets from the preceding steps were de-packaged into the hopper of a 4.5" diameter NRM 200 h.p., 30:1 L/D film casting extruder, wherein they were heated to a temperature of approximately 375 degrees Fahrenheit, at which temperature the pellets are melted. The extrusion die, after stabilization, had a temperature of approximately 370 degrees Fahrenheit, and the extrudate issuing from the extrusion die had an approximate temperature of 390 degrees Fahrenheit. Cooling water was sprayed from the coolant spray means onto one side of the inventory at the roller nip as previously described at an approximate temperature of 75 degrees Fahrenheit. The cooling water in the cooling bath in which the first and second rolls were immersed had an average temperature of 125 degrees Fahrenheit. The casting line was set to run at a speed of 300 feet per minute, and a flexible polyethylene film having a first relatively more slip-resistant first surface (which appeared smoother and shinier) than the opposite second surface (which appeared rougher and less shiny due to the visual protrusion of rubber particles above the base planar surface) was obtained. The nominal thickness of the thin film thus produced was 0.005", and both the static and kinetic coefficients of friction of the first and second surfaces were measured upon five samples of the thin film produced to obtain the average results shown in Table 3, which Table also gives the similar results for Examples 2 and 3, below. Five Samples of the thin film were measured with linear vernier callipers at five positions across the width of the film (which was 48" wide) , and the weighted average protrusion of the comminuted rubber particles was found to be 0.013". The coefficients of friction measurements were made according to ASTM D1894, Method "C", with 84±3 Shore A Durometer PVC material on the undersurface of the test sled. The results reported in Table 3 are averages based upon five tested specimens.

EXAMPLE 2

Example I was repeated in the same manner as described above, except that the line was run at a speed of 200 feet per minute, so as to produce a flexible polyethylene film having a nominal thickness of 0.018". The weighted average protrusion of the comminuted rubber particles as measured above was found to be 0.021". The coefficient of friction measurements were similarly conducted upon five samples of the thin film thus produced, and the average results are also summarized in Table 3.

EXAMPLE 3

For comparison purposes, five samples of a commercially available flexible LDPE film having a nominal thickness of 0.00375" were subjected to the same coefficient of friction test as used in Examples 1 and 2. The results of this test are also summarized in Table 3.

TABLE 3

| Coefficient of Friction | Example 1 | Example 2 | Example 3 |
|---|---|---|---|
| Static | | | |
| first surface | 0.492 | 1.002 | 0.387 |
| second surface | 0.419 | 0.407 | 0.387 |
| Kinetic | | | |
| first surface | 0.453 | 0.894 | 0.348 |
| second surface | 0.396 | 0.387 | 0.348 |

Further modifications and alternative embodiments of the inventive method and product produced thereby will be apparent to those skilled in the art having the benefit of this disclosure. Accordingly, this description and the examples are to be construed as illustrative and for the purpose of teaching those skilled in the art the manner of carrying out the invention according to the patent statute. For example, equivalent materials may be substituted for those specifically illustrated and described herein, and certain features of the invention may be utilized independently of the use of other features. All this would be apparent to one skilled in the art after having the benefit of this description of the invention.

I claim:

1. A method of producing a slip-resistant polyolefin thin film comprising the steps of:

forming a mixture of comminuted rubber material and a thermoplastic low molecular weight polyolefin polymer;

feeding the mixture into an extrusion means to melt said polymer and thereafter pumping said mixture through an extrusion die to plasticize said mixture;

providing a pair of parallel, counter-rotating first and second rolls in pre-set operatively close spaced relation, said first roll providing a generally smooth first outer circumferential surface and said second roll providing a generally smooth second outer circumferential surface, the circumferential surfaces together defining a nip between the rolls;

extruding said plasticized mixture from said die onto said first and second surfaces so as to produce an inventory of said plasticized mixture atop said nip;

cooling said inventory so as to cause the temperature of the inventory contacting said first outer circumferential surface to be between 75 to 150 degrees Fahrenheit cooler than the inventory contacting the second outer circumferential surface;

drawing said inventory into said nip so as to form a thin film of ordered thickness having opposite first and second surfaces respectively contacting the first and second outer circumferential surfaces of said first and second sizing rolls;

drawing the thin film thus formed from said nip through one or more cooling stages to further cool and stabilize said thin film;

collecting the thin film thus stabilized on one or more winder rolls adapted for such collection;

wherein the first surface of said thin film thus produced is relatively more slip-resistant than the second surface of said thin film.

2. The method of claim 1, wherein the mixture is in the form of pre-formed pellets produced by the sub-process of:

a) mixing together the vulcanized comminuted rubber material, the polyolefin polymer and conventional process aids chosen from the group consisting of stabilizers, lubricants, anti-oxidants, colorants and odour masking agents, until a substantially homogenous admixture is obtained;

b) heating the admixture of step a) in a compounder to between 300–450 degrees Fahrenheit while mixing the admixture under shear; and, c) pelletizing the product of step b) in a pelletizer to a produce pre-formed pellets having a bulk density of at least 30 pounds per cubic foot.

3. The method of claim 2, wherein the vulcanized comminuted rubber material comprises particles of 20–30 mesh size.

4. The method of claim 3, wherein the vulcanized comminuted rubber material constitutes between 10 and 35 percent, by weight, of the mixture.

5. The method of claim 4, wherein the vulcanized comminuted rubber material constitutes 20 percent, by weight, of the mixture.

6. The process according to claim 1, wherein the low molecular weight polyolefin polymer is constituted of a lower alkene or alkadiene.

7. The process according to claim 6, wherein the low molecular weight polyolefin polymer is polyethylene.

8. The process according to claim 6, wherein the low molecular weight polyolefin polymer is polypropylene.

9. The process according to claim 1, wherein the step of cooling of the inventory is carried out by spraying an inert liquid coolant upon said inventory in proximity to the location where said inventory initially contacts said first outer circumferential surface.

10. The method of claim 1, wherein the vulcanized comminuted rubber material is obtained from scrap automotive tires.

11. A slip-resistant, flexible polyolefin thin film having first and second opposed, generally planar surfaces, the film comprised of:

a) vulcanized comminuted rubber particles of between 20 to 30 mesh size; and, b) a thermoplastic low molecular weight polyolefin polymer;

wherein the rubber particles are generally evenly distributed in planar orientation throughout the film, and, wherein the rubber particles are biased in their transverse placement within the thin film toward said second surface of the thin film.

12. The slip-resistant, flexible polyolefin film of claim 11, wherein the vulcanized comminuted rubber material is obtained from scrap automotive tires.

13. The slip-resistant, flexible polyolefin film of claim 12, wherein the rubber particles constitutes between 10 and 35 percent of the weight of the film.

14. The slip-resistant, flexible polyolefin film of claim 13, wherein the rubber particles constitutes 20 per cent of the weight of the film.

15. The slip-resistant, flexible polyolefin film of claim 14, wherein the low molecular weight polyolefin polymer is constituted of lower alkene or alkadiene monomers.

16. The slip-resistant, flexible polyolefin film of claim 15, wherein the polyolefin polymer is polyethylene.

17. The slip-resistant, flexible polyolefin film of claim 15, wherein the polyolefin polymer is polypropylene.

18. The slip-resistant, flexible polyolefin film of claim 17, wherein the comminuted rubber material comprises particles of 20–30 mesh size.

* * * * *